US009002956B1

(12) United States Patent
Karam

(10) Patent No.: US 9,002,956 B1
(45) Date of Patent: Apr. 7, 2015

(54) SELF-REGULATING SOCIAL NEWS FEED

(75) Inventor: Joseph F. Karam, Mountain View, CA (US)

(73) Assignee: Google Inc., Mountain View, CA (US)

( * ) Notice: Subject to any disclaimer, the term of this patent is extended or adjusted under 35 U.S.C. 154(b) by 324 days.

(21) Appl. No.: 13/075,385

(22) Filed: Mar. 30, 2011

(51) Int. Cl.
G06F 15/16 (2006.01)
H04L 29/06 (2006.01)

(52) U.S. Cl.
CPC .................. H04L 29/0602 (2013.01)

(58) Field of Classification Search
CPC .... G06Q 10/107; H04L 12/585; H04L 12/58; H04L 12/581; H04L 12/5855
USPC .................. 709/205, 206, 207, 226
See application file for complete search history.

(56) References Cited

U.S. PATENT DOCUMENTS

| | | | |
|---|---|---|---|
| 6,130,938 | A | 10/2000 | Erb |
| 6,192,119 | B1 | 2/2001 | Wilson |
| 6,473,084 | B1 * | 10/2002 | Phillips et al. ................ 345/440 |
| 6,697,478 | B1 | 2/2004 | Meldrum et al. |
| 6,754,322 | B1 | 6/2004 | Bushnell |
| 7,106,848 | B1 | 9/2006 | Barlow et al. |
| 7,366,990 | B2 | 4/2008 | Pitroda |
| 7,555,110 | B2 | 6/2009 | Dolan et al. |
| 7,610,287 | B1 | 10/2009 | Dean et al. |
| 7,742,468 | B2 | 6/2010 | Vagelos |
| 2002/0137490 | A1 | 9/2002 | Gallant |
| 2002/0143874 | A1 | 10/2002 | Marquette et al. |
| 2004/0258220 | A1 | 12/2004 | Levine et al. |
| 2005/0152521 | A1 | 7/2005 | Liljestrand |
| 2006/0026288 | A1 | 2/2006 | Acharya et al. |
| 2006/0077957 | A1 | 4/2006 | Reddy et al. |
| 2006/0195379 | A1 * | 8/2006 | Abecassis et al. .............. 705/35 |
| 2006/0206604 | A1 | 9/2006 | O'Neil et al. |

(Continued)

FOREIGN PATENT DOCUMENTS

WO WO02079984 10/2002

OTHER PUBLICATIONS

Adamic et al., "A Social Network Caught in the Web," Internet Journal, First Monday, Jun. 2, 2003, vol. 8, No. 6, pp. 1-22.

(Continued)

Primary Examiner — Hassan Phillips
Assistant Examiner — Siren Wei
(74) Attorney, Agent, or Firm — Patent Law Works LLP

(57) ABSTRACT

A system and method for self-regulating social news feeds includes a user interface module, data storage, a loudness controller, a quality engine, and an output or news feed module. The user interface module is adapted to receive input from the user including a loudness value associated with a particular message. The loudness value is associated with an originally generated message or a response (reply) to an existing message. The messages and their associated loudness values are provided to the loudness controller. The loudness controller sorts the messages in order of loudness. The loudness values are also modified based upon input from the quality engine. The quality engine modifies the loudness values based upon a quality rating associated with the user. The output of the loudness controller is provided for presentation to the user via the output or news feed module. The present disclosure also describes a number of methods including a method for posting a message with loudness points, a method for replying with loudness points, a method for modifying the point value for message, and a method for modifying a point total of the user.

29 Claims, 13 Drawing Sheets

(56) References Cited

U.S. PATENT DOCUMENTS

| | | | |
|---|---|---|---|
| 2007/0127631 | A1 | 6/2007 | Difiglia |
| 2007/0171898 | A1 | 7/2007 | Salva |
| 2007/0173236 | A1 | 7/2007 | Vishwanathan et al. |
| 2007/0248077 | A1 | 10/2007 | Mahle, Jr. et al. |
| 2007/0266097 | A1* | 11/2007 | Harik et al. ............... 709/204 |
| 2008/0045236 | A1* | 2/2008 | Nahon et al. ............. 455/456.1 |
| 2008/0056475 | A1 | 3/2008 | Brannick et al. |
| 2008/0086534 | A1* | 4/2008 | Bardak et al. ............. 709/206 |
| 2008/0192656 | A1 | 8/2008 | Vagelos |
| 2009/0063260 | A1* | 3/2009 | Hibbets .................... 705/14 |
| 2009/0144192 | A1* | 6/2009 | Zhu ........................... 705/39 |
| 2010/0114946 | A1* | 5/2010 | Kumar et al. .............. 707/770 |
| 2011/0098156 | A1 | 4/2011 | Ng et al. |
| 2011/0225170 | A1* | 9/2011 | Obasanjo et al. .......... 707/748 |

OTHER PUBLICATIONS

Agarwal et al., "Enabling Real-Time User Interests for Next Generation Activity-Oriented Social Networks," Thesis submitted to the Indian Institute of Technology Delhi, Department of Computer Science & Engineering, 2005, 70 pgs.

Anwar et al., "Leveraging 'Social-Network' Infrastructure to Improve Peer-to Peer Overlay Performance: Results from Orkut," University of Illinois at Urbana-Champaign USA, 2005, 9 pgs.

AT&T Personal Reach Service: Benefits and Features, Mar. 29, 2010, 7 pgs.

AT&T Personal Reach Service: Personal Reach Service, Mar. 29, 2010, 2 pgs.

Baird et al., "Neomillennial User Experience Design Strategies: Utilizing Social Networking Media to Support "Always On" Learning Styles," J. Educational Technology Systems, vol. 34(1), 2005-2006, Baywood Publishing Co., Inc., pp. 5-32.

Boyd, et al., "Social Network Sites: Definition, History, and Scholarship," Journal of Computer-Mediated Communication, International Communication Association, 2008, pp. 210-230.

Churchill et al., "Social Networks and Social Networking," IEEE Computer Society, Sep.-Oct. 2005, pp. 14-19.

Cohen et al., "Social Networks for Creative Collaboration," C&C '05, Apr. 12-15, 2005, London, United Kingdom, pp. 252-255.

Decker et al., "The Social Semantic Desktop," Digital Enterprise Research Institute, DERI Galway, Ireland, DERI Innsbruck, Austria, DERI Technical Report, May 2, 2004, 7 pgs.

Dukes-Schlossberg et al., "Battlefield Awareness and Data Dissemination Intelligent Information Dissemination Server," Air Force Research Laboratory, Rome Research Site, Rome, NY, Nov. 1, 1999, 31 pgs.

Eagle et al., "Social Serendipity: Proximity Sensing and Cueing," MIT Media Laboratory Technical Note 580, May 2004, 18 pgs.

Erickson et al., "Social Translucence: Using Minimalist Visualizations of Social Activity to Support Collective Interaction," Designing Information Spaces: The Social Navigation Approach, Springer-verlag: London, 2003, pp. 1-19.

Gross et al., "Information Revelation and Privacy in Online Social Networks," WPES '05, Alexandria, Virginia, Nov. 7, 2005, pp. 71-80.

Hammond et al., "Social Bookmarking Tools (I)," D-Lib Magazine, Apr. 2005, vol. II, No. 4, ISSN 1082-9873, 23 pgs.

Heer et al., "Vizster: Visualizing Online Social Networks," University of California, Berkeley, 8 pgs.

International Search Report, International Application No. PCT/US2008/005118, Sep. 30, 2008, 2 pgs.

Leonard, "You Are Who You Know," Internet, retrieved at http://www.salon.com, Jun. 15, 2004, 15 pgs.

LiveJournal, "FAQ #163: How Do I Find a Syndicated Account?" Last Updated: thebubba, Jan. 6, 2004, 2 pgs.

Marwick, "Selling Your Self: Online Identity in the Age of a Commodified Internet," University of Washington, 2005, 192 pgs.

MediaSift Ltd., DataSift: Realtime Social Data Mining Platform, Curate and Data Mine the Real Time Web with DataSift, Dedipower, Managed Hosting, [Retrieved on May 13, 2011], 1 pg.

Metcalf et al., "Spatial Dynamics of Social Network Evolution," 23rd International Conference of the System Dynamics Society, Jul. 19, 2005, pp. 1-13.

Mori et al., "Real-world Oriented Information Sharing Using Social Networks," Group '05, Sanibel Island, Florida, USA, Nov. 6-9, 2005, pp. 81-84.

Murchu et al., "Online Social and Business Networking Communities," Digital Enterprise Research Institute DERI Technical Report, National University of Ireland, Aug. 11, 2004, 22 pgs.

Nardi et al., "Blogging as Social Activity, or, Would You Let 900 Million People Read Your Diary?" CSCW'04, Nov. 6-10, 2004, vol. 6, Issue 3, Chicago, Illinois, pp. 222-231.

Neumann et al., "Semantic social network portal for collaborative online communities," Journal of European Industrial Training, 2005, Emerald Group Publishing, Limited, vol. 29, No. 6, pp. 472-487.

Ring Central, Inc., Internet, retrieved at http://www.ringcentral.com, Apr. 19, 2007, 1 pg.

Singh et al., "CINEMA: Columbia InterNet Extensible Multimedia Architecture," Department of Computer Science, Columbia University, pp. 1-83.

Steen et al., "Development of we-centric, context-aware, adaptive mobile services requires empathy and dialogue," Freeband FRUX, Oct. 17, 2005, Internet Journal, Netherlands, pp. 1-4.

Superfeedr Track, Internet, retrieved at http://blog.superfeedr.com/track/filter/xmpp/pubsubhubbub/track, May 13, 2011, 8 pgs.

Twitter Blog: Tracking Twitter, Internet, retrieved at http://blog.twitter.com/2007/09/tracking-twitter.html, May 13, 2011, 2 pgs.

Twitter Announces Fire Hose Marketplace: Up to 10K Keyword Filters for 30 Cents, Internet, retrieved at http://www.readywriteweb.com/archives/twitter_announces_fire_hose_marketplace_up_to_10k.php, May 13, 2011, 7 pgs.

Van Eijk et al., "We-centric, context-aware, adaptive mobile service bundles," Freeband, Telematica Instituut, TNO telecom, Nov. 30, 2004, 48 pgs.

Wenger et al., "Technology for Communities," CEFRIO Book Chapter v 5.2, Jan. 18, 2005, pp. 1-15.

\* cited by examiner

SELF-REGULATING SOCIAL NEWS FEED

BACKGROUND

The present disclosure relates to social networks and electronic communication. In particular, the present disclosure relates to a system and methods for associating a "loudness," relevance or importance to electronic communications in social networks. Still more particularly, the present disclosure relates to a system and method for self-regulating social news feeds.

Spam e-mail (known also as junk e-mail or unsolicited bulk e-mail) is generally identical e-mail messages sent to numerous recipients who did not request it. The phrase spam has also been applied to other communications such as those in social networks such as instant messages or posts. Spam used to be generated primarily and most often by unknown third-parties trying to sell you something. In recent years, however, spam has increasingly been generated by your own friends, and to some extent, possibly by yourself. The advent of social news feeds embedded in online social networks has made it clear that, if given an unlimited amount of bandwidth to express themselves, a loud minority of users will abuse that freedom and post excessively/frequently on these shared spaces, sharing random fleeting thoughts of little significance, making it time-consuming for everyone else to filter their way to more worthwhile messages. Even among users who think more carefully before posting, not all their messages are of equal importance.

The prior art has attempted to address this problem, but existing solutions to minimize exposure to low-quality messages are often too extreme and/or impractical. For example, several impractical solutions are avoiding the social network in question, removing the loud user from the list of contacts or silencing the loud user. However, even loud users have interesting things to say once in awhile, and even deliberate users sometimes say trivial things. Thus, targeting individual users instead of individual messages fails to solve the problem.

Existing solutions are typically aimed at maximizing exposure of high-quality messages and usually rely exclusively on the volume of response from the audience. While this is often helpful, many important messages that are not immediately caught into a self-perpetuating cycle of public approval end up getting quickly buried along with all the junk messages.

SUMMARY

The present disclosure overcomes the deficiencies and limitations of the prior art at least in part by providing a system and method for self-regulating social news feeds. In particular, the present disclosure is directed to systems and methods that allow the user to specify a "loudness" or importance for messages that are posted. In one embodiment, the system includes a user interface module, data storage, a loudness controller, a quality engine, and an output or news feed module. The user interface module is adapted to receive input from the user including loudness points associated with a particular message. The loudness points can be associated with an originally generated message or a reply to/review of an existing message. The messages and their associated loudness points are provided to the loudness controller. The loudness controller applies loudness points based upon the author's assigned points and points input by replies to the original message. The loudness controller then sorts the messages in order of loudness. The loudness points can also be modified based upon input from the quality engine. The quality engine modifies the loudness points based upon a quality rating associated with the user. The output of the loudness controller is provided for presentation to the user via the output or news feed module.

The present disclosure is particularly advantageous because it provides a system and interface that enable users posting messages to social news feeds to allocate importance/loudness points to each message they are about to post, from a slowly-replenishing but ultimately finite pool of points available to them. This ensures that each time a message is posted, the person posting the message has already prioritized the importance of that message relative to other messages posted by them. Furthermore, the present disclosure is advantageous because it allows ranking of messages not only based on how the audience perceives each message, but also based on how the person issuing the message feels it ought to be ranked relative to other messages they typically issue.

The present disclosure also describes a number of methods including a method for posting a message with loudness points, a method for replying with loudness points, a method for modifying the loudness points for message, and a method for modifying a loudness point total of the user.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1:
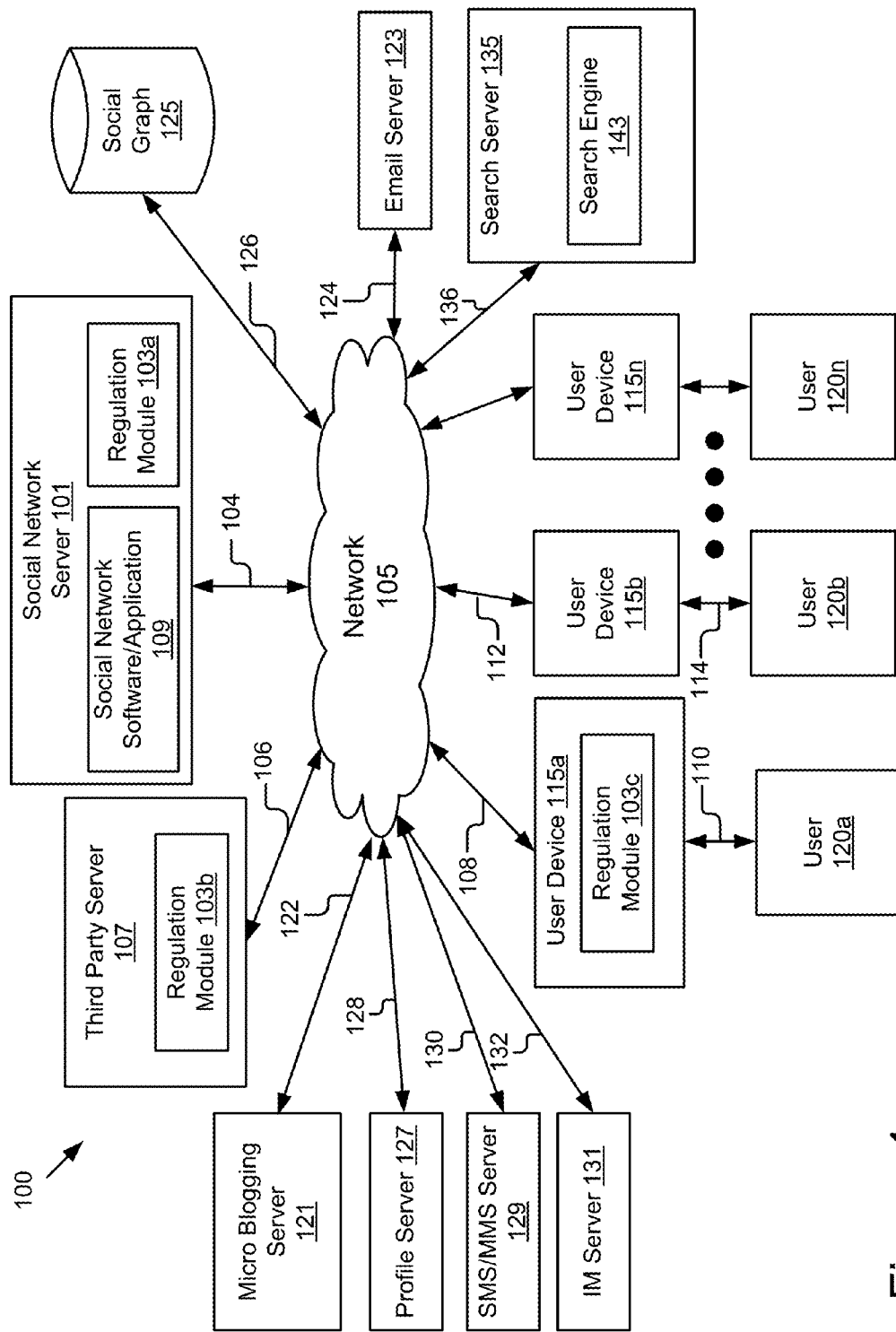
FIG. 1 is a high-level block diagram illustrating a functional view of a system for self-regulating messages in a social network according to one embodiment.

A system and methods for associating "loudness," relevance, or importance points to electronic communications in social networks is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention. For example, the present invention is described in one embodiment below with reference to user interfaces and particular hardware. However, the present invention applies to any type of computing device that can receive data and commands, and any devices providing services. Moreover, the present invention is described below primarily in the context of newsfeeds for social networks; however, those skilled the art will understand that the present invention applies to any type of communication and can be used for other applications beyond social networks such as but not limited to micro blogging, instant messaging, e-mail, etc.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

System Overview

FIG. 1 illustrates a block diagram of a system 100 for associating a "loudness" or importance to electronic communications according to one embodiment of the present disclosure. The illustrated system 100 for applying loudness or importance points to electronic communications includes user devices 115$a$, 115$b$, 115$n$ that are accessed by users 120$a$, 120$b$, 120$n$, a social network server 101 and a third party server 107. In the illustrated embodiment, these entities are communicatively coupled via a network 105. Although only three devices 115 are illustrated, persons of ordinary skill in the art will recognize that any numbers of user devices 115$n$ are available to any number of users 120$n$.

The user devices 115$a$, 115$b$, 115$n$ in FIG. 1 are used by way of example. While FIG. 1 illustrates three devices, the present disclosure applies to any system architecture having one or more user devices. Furthermore, while only one network 105 is coupled to the user devices, 115$a$, 115$b$, 115$n$, the social network server 101 and the third party server 107, in practice any number of networks 105 can be connected to the entities. Furthermore, while only one third party server 107 is shown, the system 100 could include one or more third party servers 107.

In one embodiment, the regulation module 103$a$ is operable on the social network server 101, which is coupled to the network 105 via signal line 104. The social network server 101 also includes a social network software/application 109.

Although only one social network server 101 is shown, persons of ordinary skill in the art will recognize that multiple servers may be present. A social network is any type of social structure where the users are connected by a common feature, for example, Orkut. The common feature includes relationships/connections, e.g., friendship, family, work, an interest, etc. The common features are provided by one or more social networking systems, such as those included in the system 100, including explicitly-defined relationships and relationships implied by social connections with other online users, where the relationships form a social graph. In some examples, the social graph 125 can reflect a mapping of these users and how they are related. Furthermore, it should be understood that social network server 101 and social network software/application 109 are representative of one social network and that there are multiple social networks coupled to the network 105, each having its own server, application and social graph. For example, a first social network is more directed to business networking, a second more directed to or centered on academics, a third is more directed to local business, a fourth directed to dating and others of general interest or a specific focus.

In another embodiment, the regulation module 103b is stored on a third party server 107, which is connected to the network 105 via signal line 106. In yet another embodiment, the regulation module 103c is stored on a user device 115a, which is connected to the network 105 via signal line 108. The user 120a interacts with the user device 115a via signal line 110. Similarly, the user device 115b is coupled to the network 105 via signal line 112 and the user 120b interacts with the user device 115b via signal line 114. Persons of ordinary skill in the art will recognize that the regulation module 103 can be stored in any combination on the devices and servers.

The network 105 is a conventional type, wired or wireless, and may have any number of configurations such as a star configuration, token ring configuration or other configurations known to those skilled in the art. Furthermore, the network 105 may comprise a local area network (LAN), a wide area network (WAN) (e.g., the Internet), and/or any other interconnected data path across which multiple devices may communicate. In yet another embodiment, the network 105 may be a peer-to-peer network. The network 105 may also be coupled to or includes portions of a telecommunications network for sending data in a variety of different communication protocols. In yet another embodiment, the network 105 includes Bluetooth communication networks or a cellular communications network for sending and receiving data such as via short messaging service (SMS), multimedia messaging service (MMS), hypertext transfer protocol (HTTP), direct data connection, WAP, email, etc.

The regulation module 103 interacts with other messaging systems to add loudness points associated with each message. The regulation module 103 also generates and presents user interfaces that allow the user to create messages with associated loudness points, create reply messages with associated loudness points, and view messages and their associated loudness points. Loudness points are an assigned value in accordance with the present disclosure that are used as an indication of importance to the originator of the message as well as other users that review or apply to the original message. Throughout the disclosure the follows, the loudness points are applied to both the originating messages and replies. However, it should be understood that in other embodiments different pools or groupings of importance points may be created and managed by the present invention. For example, a user may have a first pool of loudness points for original messages and a second pool of approval points for reply messages. In one embodiment, the regulation module 103 receives data from a user via user devices 115. The regulation module 103} with the user devices 115 and the social network application 109 to present news message feeds and associated loudness points for each message in the feed. In another embodiment, the regulation module 103 cooperates with the email server 123 loudness points for e-mail messages. In another embodiment, the regulation module 103 also receives data related to electronic communication from a Short Message Service (SMS)/Multimedia Messaging Service (MMS) server 129, an instant messaging (IM) server 131, and/or the third party server 107. In yet another embodiment, the regulation module 103 also receives data related to electronic communication from the search server 135 that includes a search engine 143 and is coupled to the network 105 via signal line 136. In one embodiment, the search server 135 includes a search engine 143 for retrieving results that match search terms from the Internet. In one embodiment, the search engine 143 is powered by Google®. The social network application 109 in conjunction with the regulation module 103 are used to manage and send data to and from the third party server 107 via signal line 106, the micro-blogging server 121 via signal line 122, the profile server 127 via signal line 128, the user devices 115 via signal lines 108 and 112, the e-mail server 123 via signal line 124, the social graph 125 via signal line 126, the SMS/MMS server 129 via signal line 130 and the IM server 131 via signal line 132.

In one embodiment, the social network server 101, the third party server 107, the micro-blogging server 121, the e-mail server 123, the profile server 127, the SMS/MMS server 129, the IM server 131, and the search server 135 are hardware servers including a processor, memory, and network communication capabilities.

Regulation Module 103

Figure 2:
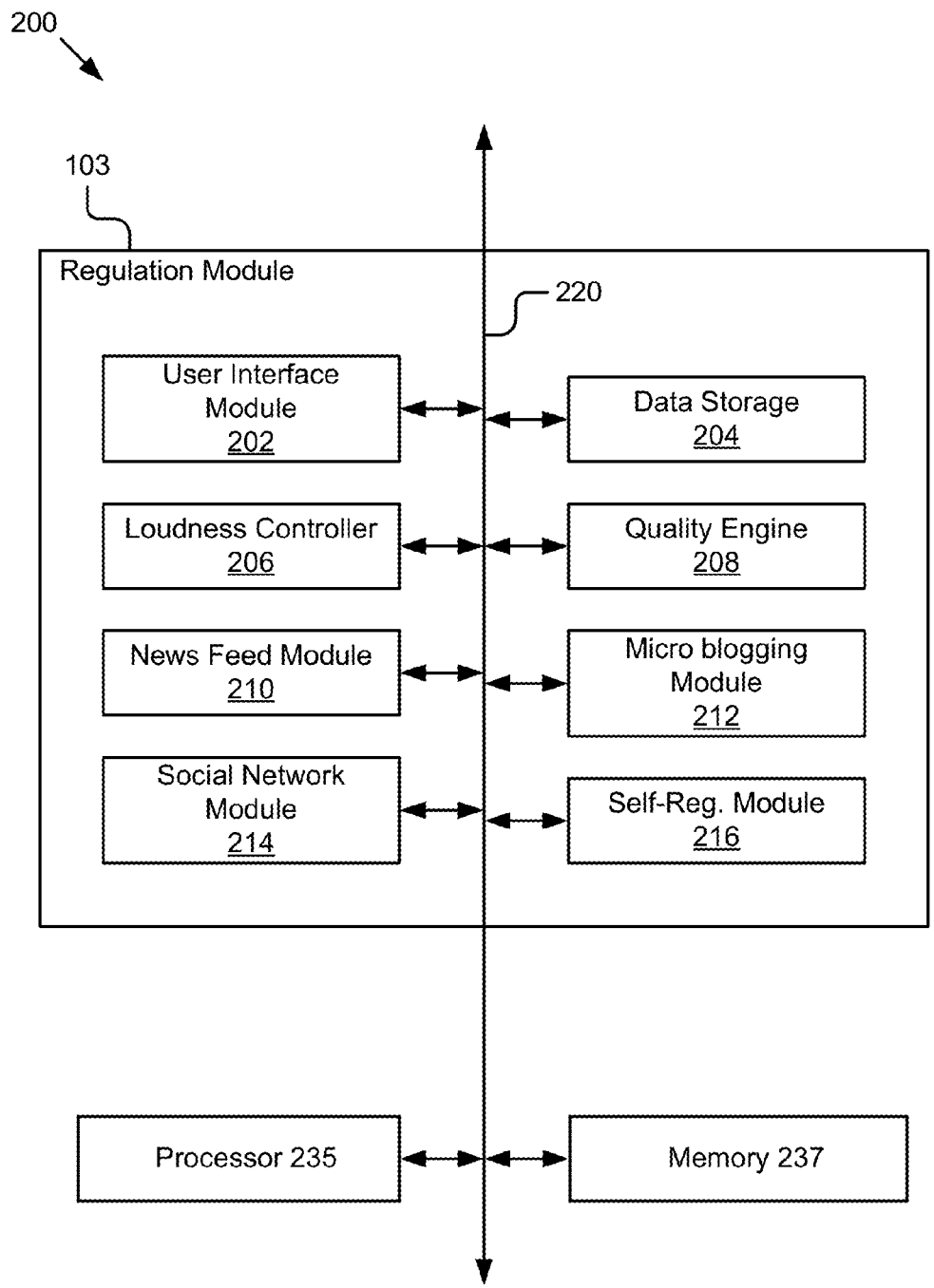
FIG. 2 is a high-level block diagram illustrating a regulation module according to one embodiment.

Referring now to FIG. 2, the regulation module 103 is shown in more detail. FIG. 2 is a block diagram of a computing device 200 that includes the regulation module 103, a memory 237 and a processor 235. In one embodiment, the computing 200 device is a social network server 101. In another embodiment, the computing device 200 is a third party server 107. In yet another embodiment, the computing device 200 is a user device 115a.

The processor 235 comprises an arithmetic logic unit, a microprocessor, a general purpose controller or some other processor array to perform computations and provide electronic display signals to a display device. The processor 235 is coupled to the bus 220 for communication with the other components via signal line 236. Processor 235 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. It will be obvious to one skilled in the art that other processors, operating systems, sensors, displays and physical configurations are possible.

The memory 237 stores instructions and/or data that may be executed by processor 235. The memory 237 is coupled to the bus 220 for communication with the other components. The instructions and/or data may comprise code for performing any and/or all of the techniques described herein. The memory 237 may be a dynamic random access memory (DRAM) device, a static random access memory (SRAM) device, flash memory or some other memory device known in the art. In one embodiment, the memory 237 also includes a non-volatile memory or similar permanent storage device and media such as a hard disk drive, a floppy disk drive, a CD-ROM device, a DVD-ROM device, a DVD-RAM device, a DVD-RW device, or some other mass storage device known in the art for storing information on a more permanent basis.

In one embodiment, the regulation module 103 comprises a user interface module 202, data storage 204, a loudness controller 206, a quality engine 208, a newsfeed module 210, a micro-blogging module 212, a social network module 214, and a self-regulation module 216. These modules, storage, controller and engine 204-216 are configured for communication with each other, the processor 235 and the memory 237 via bus 220. The bus 220 can be any type of conventional communication bus.

One or more of the user interface module 202, the data storage 204, the loudness controller 206, the quality engine 208, the news feed module 210, the micro-blogging module 212, the social network module 214 and the self-regulation module 216 is software including routines for associating "loudness" or importance points to messages. In another embodiment, one or more of the user interface module 202, the data storage 204, the loudness controller 206, the quality engine 208, the news feed module 210, the micro-blogging module 212, the social network module 214 and the self-regulation module 216 store data that, when executed by the processor 235, causes the modules to perform the operations described below. In yet another embodiment, one or more of the user interface module 202, the data storage 204, the loudness controller 206, the quality engine 208, the news feed module 210, the micro-blogging module 212, the social network module 214 and the self-regulation module 216 are instructions executable by the processor 235 to provide the functionality described below with reference to FIGS. 4-9B. In still another embodiment, one or more of the user interface module 202, the data storage 204, the loudness controller 206, the quality engine 208, the news feed module 210, the micro-blogging module 212, the social network module 214 and the self-regulation module 216 is stored in the memory 237 of the computing device 200 and is accessible and executable by the processor 235.

The user interface module 202 allows the regulation module 103 to interact with the user. For example, the user interface module 202 generates and presents graphic user interfaces (GUI) that allow interaction with the user such as via user device 115. The user interface module 202 is coupled by the bus 220 to the network 105 and to the user devices 115a-115n. Those skilled in the art will recognize that the interface module 202 can also be coupled to any other input/output devices associated with any of the other components in FIG. 1. The user interface module 202 generates and sends interfaces as will be described in more detail below with reference to FIGS. 8-9B for sending messages, replying to messages, reviewing messages, and associating loudness points with those messages. The user interface module 202 also receives input from the user related to the interfaces and the association of loudness points with messages. The user interface module 202 is also coupled to provide information to the data storage 204, the loudness controller 206 and the quality engine 208.

In one embodiment, data storage 204 stores data and information used by the regulation module 103. Such stored information includes information about users, information about messages, and information about loudness points. In one embodiment, the data storage 204 also stores quality ratings and other data generated by loudness controller 206 and the quality engine 208. For example, the loudness controller 206 may process the messages and replies and associate a loudness value with a particular message. Similarly, the quality of a particular user's replies or original messages can be tracked, stored and provided to the loudness controller 206 to modify loudness point values. Data storage 204 stores data and instructions and comprises one or more devices including a hard disk drive, a floppy disk drive, a CD-ROM device, a DVD-ROM device, a DVD-RAM device, a DVD-RW device, a flash memory device, or some other mass storage device known in the art. The data storage 204 is coupled by the bus 220 for communication with the user interface module 202, the loudness controller 206, and the quality engine 208. In other embodiments, the data storage 204 is coupled to provide data to the news feed module 210, the micro-blogging module 212, the social network module 214 and the self-regulation module 216.

Figure 3:
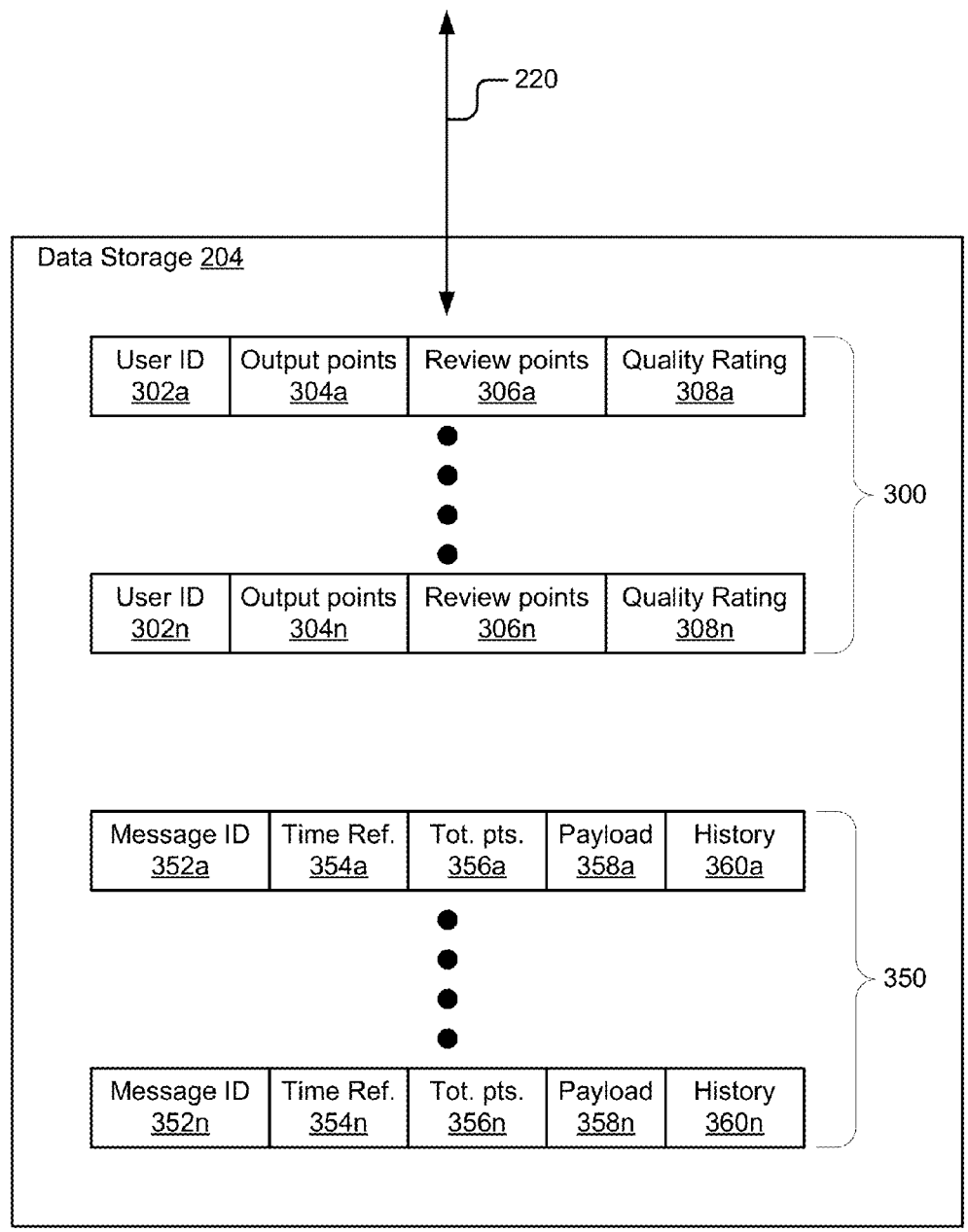
FIG. 3 is a high-level block diagram illustrating data storage of the regulation module according to one embodiment.

Referring now also to FIG. 3, one embodiment for the data storage 204 is shown. In this embodiment, the data storage 204 includes a first portion 302 for storing point information about users and a second portion 350 for storing point information about messages. The first portion 300 comprises a plurality of records with each record including a user ID field 302, an output points field 304, a review points field 306 and the quality rating 308. The user ID field 302 stores a unique number that identifies the user. The output points field 304 stores a value indicating a number of loudness points that are available to the user to associate with original messages (the pool of loudness points available to the user). The review or reply points field 306 stores a value indicating the number of loudness or approval points that are available for the user to add to replies. In one embodiment, there is no pool of loudness points required for replies and replies may be freely made. In another embodiment, approval or loudness points are treated the same and both are deducted from the output points field 304. The quality rating field 308 stores a value indicating a multiplier (increasing or decreasing) for point values based upon whether the user provides high-quality or low quality content in his or her messages. Those skilled the art will recognize that this format shown in FIG. 3 for tracking loudness points of each user is just merely one example. In alternate embodiments, there may be a single point total available to the user and the output points field 304 and the review points field 306 are replaced by a single field that accumulates points and does not discriminate whether the points are used for replies original messages. In another embodiment, there is no quality rating field 308.

The second portion 350 of the data storage 204 includes a plurality of records with each record corresponding to a particular message. In one example embodiment, the records for each message include a message identifier field 352, a time reference field 354, a total number of points field 356, a payload field 358 and a history field 360. The message identifier field 352 is used to store a unique number that identifies the message. The time reference field 354 stores a time value indicating the time and date when the message was first created and posted. This time reference field 354 is used by the loudness controller 206 to adjust the total point value associated with the message for decay over time. The total number of points field 356 stores a value indicating the original loudness points associated with the message plus any additional loudness points that have been given by other users during review or reply. The payload field 358 stores the original message content. The history field 360 stores information about the loudness history of the message such as how many loudness points the method originally had one posted, how many additional points have been added (or subtracted) because of replies or time. Similar to the records for the users, those skilled in the art will recognize that the records depicted in FIG. 3 are merely one example of an embodiment for the message records. Various modifications or adjustments to these records are possible and within the scope of the present disclosure such as eliminating the history field 360 or the payload field 358.

The loudness controller 206 is coupled to the user interface module 202, the data storage 204, the quality engine 208, the news feed module 210, the micro-blogging module 212, the social network module 214 and the self regulation module 216. The loudness controller 206 receives input from the user via the user interface 202 and assigns loudness points to messages. The loudness controller 206 also communicates with the data storage 204 to deduct loudness points from the total points available for the originator of the message. The present invention is particularly advantageous because each user is provided with only a finite number of loudness points to associate with messages. Once a user has used all their loudness points, they are not able to add loudness points to any additional messages that they send, thereby effectively losing their voice. This is advantageous because it forces the users to be thoughtful about the number of loudness points they are going to associate with each message, thereby causing the users to self regulate and self identify the importance of each message and thereby the number of loudness points that should be associated with it. The number of loudness points associated with the method also indicates to others how important the originator of the message considered the message to be. In another embodiment, the loudness controller 206 allows a user to create messages, but does not post them until a later time in the future when the user has accumulated enough loudness points for the message. However, the more loudness points the user assigns to the message the longer in the future the message will be delayed/scheduled for posting. In yet another embodiment, the loudness controller 206 allocates each user a limited number of emergency messages that can be posted. Such emergency messages are posted immediately without delay but include severe penalties if others deem an emergency post to have been used in abuse. Such emergency posts may have assigned number of points or may be give special status and put at top of the message feed. The loudness controller 206 also tracks the loudness points associated with each message and communicates with the data storage 204 to use the data structure that has been described above. The loudness controller 206 tracks not only the loudness points that were originally associated with the message, but also tracks reply or review points that have been added or subtracted from the loudness points by other users that have reviewed or replied to the original message. The loudness controller 206 also deducts loudness points from message due to time decay.

In one embodiment, the loudness controller 206 also communicates with the quality engine 208 to determine a quality for the user. This quality rating is used by the loudness controller 206 to increase or decrease the number of points associated with a message based upon the quality rating of the original author of the message or replies to the message. For example, if a particular originator of messages has a high quality ranking and thereby has a multiplier of two times, the loudness controller 206 will multiply the loudness points originally input by the message originator by a factor of two because of this quality rating. In a similar vein, the multiplier may decrease the loudness points for individuals of users that are notorious for sending messages with little or no value.

In another embodiment, the loudness controller 206 adjusts the total point values of messages based upon the time that has elapsed since the message was created and posted. For example, the loudness point value associated with each message can decay over time. The loudness controller 206 uses the timestamp associated with a message and adjusts the total points associated with the message based upon how much time has elapsed. In one embodiment, the messages are reviewed on a periodic basis such as daily, weekly, or monthly. In a similar way, the loudness controller 206 also adds loudness points to users after the passage of time. In one embodiment, each user is awarded additional loudness points such as on a daily basis. For example, users may be given an additional 3 points per day. Those skilled in the art will recognize that in addition to the passage of time, additional points may be granted or awarded based upon different factors such as the number of messages that have been posted, an average number of messages that have been posted over time, the quality of the messages that have been posted, the number of replies that have been received, etc.

In yet another embodiment, the loudness controller 206 retrieves and orders messages relevant to a particular user according to the number of loudness points associated with each message. For example, the messages are selected based on their relevance or interest to a particular user. Once a set of messages has been determined, those messages are sorted from the messages with the highest number of loudness points to the messages with the lowest number of loudness points. In other embodiments, the loudness controller 206 applies a filter to provide only a predetermined number of messages from the messages with the highest loudness point values or only those messages that have a loudness point total above a predetermined threshold. The loudness controller 206 interacts with the user interface module 202 to present the messages as will be described in more detail below with reference to FIGS. 9A and 9B.

The quality engine 208 is coupled to the loudness controller 206 to provide a quality rating. The quality engine 208 is also coupled by the bus 220 to other systems in FIG. 1 to receive information and generates a quality rating from that information. In one embodiment, the quality engine 208 provides a multiplier that is used for increasing or decreasing the number of points that are regenerated and given to the user. In another embodiment, the quality engine 208 provides a multiplier of the number of points used per message thereby increasing or decreasing the voice of the user. In still another embodiment, the quality rating is a multiplier of the number of loudness points available to the user. In one embodiment, the loudness points are adjusted based upon the user's reputation. For example, particular users may be known or identified as experts in particular fields, thus when they sent messages on those topics about which they are an expert, their quality rating is increased. Also, the user's points may be adjusted for quality of past messages or replies. In another example, the system tracks how many messages are posted by a particular user and those messages are analyzed based upon length and frequency. Users that post frequent short messages will have a lower quality rating compared to users that post infrequently but longer messages. In another embodiment, the quality engine 208 tracks the number of rely post to an original message, and if there are no replies, the quality rating is low and if there are a large number of replies the quality rating is high. In yet another embodiment, the quality engine 208 extracts information such as reputation from other systems such as the social network 109 and translates that reputation into a quality rating. For example, the number of points may be multiplied or divided depending upon the size of the user's social graph. In other words, the loudness points can be divided by the audience, the number of friends of the user and thereby neutralize the statistical importance of the size of a user social graph. The quality engine 208 processes this information and generates a multiplier that is provided to the loudness controller 206. The multiplier can be greater than one in which case it amplifies or increases the loudness points of the user. The quality rating can also be a fraction of one and thus will dampen or decrease the loudness points of the user.

The news feed module 210 is a module that allows the loudness controller 206 to interface with a news feed of a social network or other system. The news feed module 210 is coupled to receive messages and associated loudness values from the loudness controller 206 and provide them to such other systems.

The micro-blogging module 212 is a module that allows the loudness controller 206 to interface with the micro-blogging server 121. In one embodiment, micro-blog posts can also have an associated loudness value. The micro-blogging module 212 interfaces with the micro-blogging server 121 to provide loudness information and point values from the loudness controller 206. For example, the micro-blogging module 212 sends loudness point values and the micro-blog post to which they are associated, as well as loudness point values for re-blogs or other actions on the micro-blogging server 121. Those skilled in the art will recognize that the above operations and modifications noted above are merely a subset of possible inputs that may be provided by micro-blogging module 212 to the micro-blogging server 121.

The social network module 214 is a module that allows the loudness controller 206 to interface with the social network application 109. In one embodiment, any type of message within the social network application 109 can be provided with an associated loudness value. The social network module 214 interfaces with the loudness controller 206 so that the loudness controller 206 can provide the loudness point values and perform the operations described above for the messages within the social network application 109 that have associated loudness values. The social network module 214 is coupled to the loudness controller 206 and to the social network application via the bus 220.

The self-regulation module 216 is for outputting the loudness point values of messages and users, and other information related to loudness points and quality to other systems 101, 107, 109, 121, 125, 127, 129, 131, 115, 123, 135, 125 such as the social graph 125, the user profile server 127, etc. For example, the self-regulation module 216 may include application interfaces that allow it to communicate with these other systems 101, 107, 109, 121, 125, 127, 129, 131, 115, 123, 135, 125. The self-regulation module 216 is coupled to receive loudness points, messages and other information from the loudness controller 206 or the data storage 204. In one embodiment, the self-regulation module 216 is coupled by bus 220 to the network 105, and thus, the other systems 101, 107, 121, 125, 127, 129, 131, 115, 123, 135, 125.

Methods

Referring now to FIGS. 4-7, the methods of the present disclosure will be described.

Figure 4:
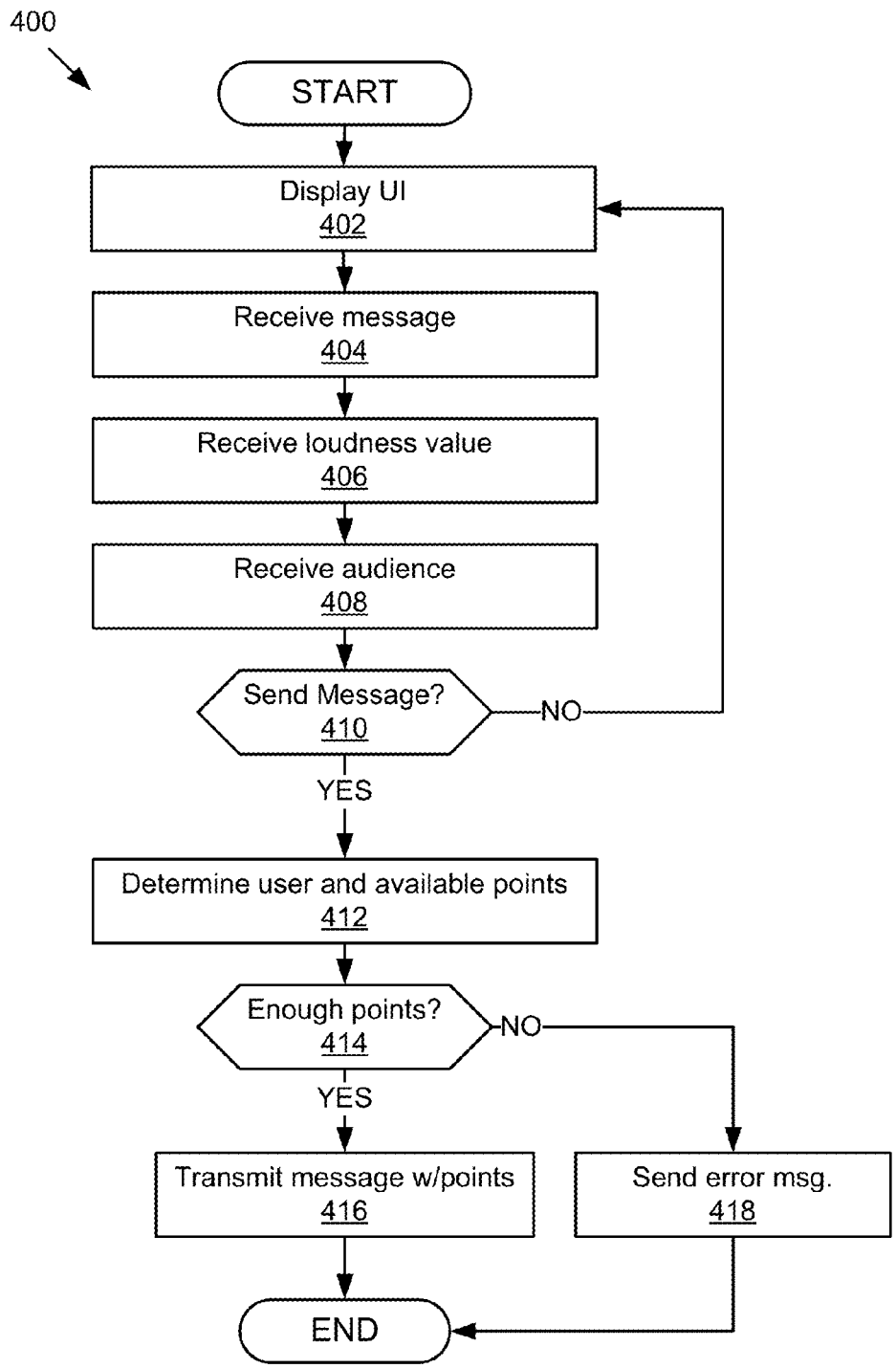
FIG. 4 is a flowchart of a method for sending or posting a message with loudness points according to one embodiment.

Referring now to FIG. 4, a method for posting a message with loudness points will be described in more detail. The method begins by displaying 402 a user interface 800 for sending messages with associated loudness points. In one embodiment, the user interface module 202 causes a user interface 800 to be displayed on the user device 115. An example user interface 800 is described immediately below with reference to FIG. 8. As has been noted above, in other embodiments, the user interface 800 may be integrated as part of other systems such as an e-mail client, a newsfeed interface or a social network interface.

Figure 8:
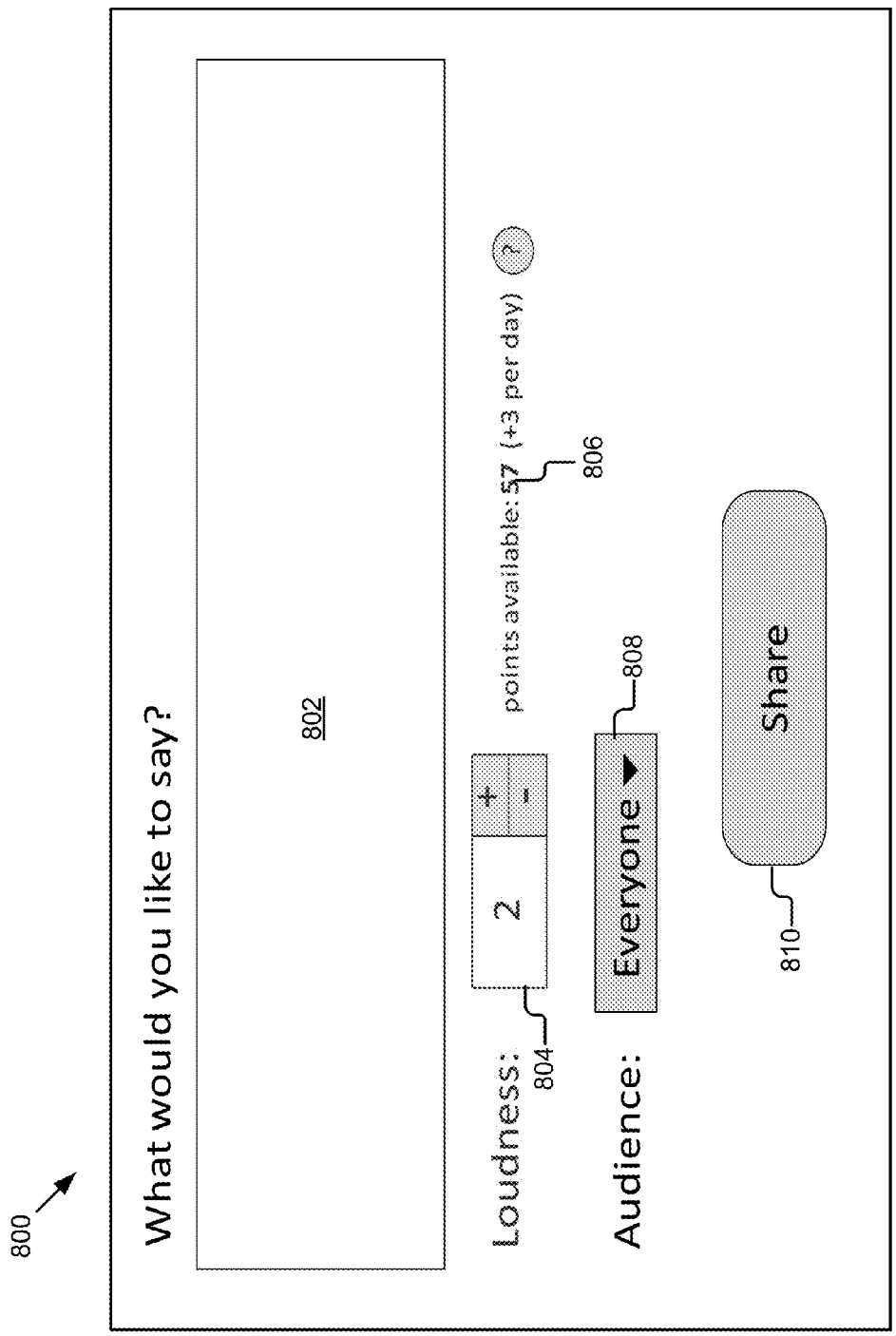
FIG. 8 is a graphic representation of one embodiment of a user interface for inputting a message and assigning loudness points.

Referring now also to FIG. 8, an example user interface 800 is shown. The user interface 800 includes a window having a number of components including a message box 802 in which the user can input a message, a loudness box 804 that allows the user to assign loudness points, a field 806 indicating the number of loudness points available to the user, a pull down menu 808 for selecting the audience that will receive the message, and a button 810 for sending or sharing the message.

In the simplest embodiment, the message box 802 is an area in which the user can type in the message that they want posted or sent. As shown in FIG. 8, the message box 802 has a caption of "What would like to say?" In an alternate embodiment, the message box 802 has other captions or for reply messages and includes the message to which the user is replying in the message box 802.

The loudness box 804 allows the user to input the number of loudness points that the user would like to be associated with the message in the message box 802. The user can either manually input a number in the loudness box 804 or the user can use the "+" or "−" buttons to increment or decrement the value in the loudness box 804. In one embodiment, the user interface module 202 automatically inputs a loudness value such as one or two into the loudness box 804. Awarding more loudness points to a particular message will make it appear more prominently in the audience's message feeds. For example, a message posted with five points is more likely to appear ahead of a message posted by others with four points or fewer. Points allocated to a message are deducted from the user's pool of loudness points.

The present disclosure is particularly advantageous because of the self regulating effect the assignment of loudness points have. To that end, the user interface 800 includes a field 806 indicating the number of loudness points that the user has available for use. Once the user has zero loudness points, they effectively cannot speak; and therefore, cannot send messages. The user interface 800 also includes an indication of the rate at which loudness points will be regenerated or provided to the user. In this case, it is based upon time and each user receives an additional three loudness points per day. In other embodiments, the rate and factors upon which additional loudness points are given to each user may vary. For example, various factors such as time, quality, frequency, and number of replies may cause a particular user to have loudness points replenished or given at different rates. For example, a user may be rewarded with additional loudness points where the quality of their messages is high or the rate at which loudness points are replenished is at a higher rate for the higher quality users. If a message that has been posted by the user receives a high number of replies, the user may be given additional loudness points because of the number of replies to their original message. In such a case, the number of replies is in a preferred measure of quality. In another embodiment, users are allowed to borrow a loudness points up to a predefined limit. For example, users are able to lend/borrow points to others and be paid back with interest. Furthermore, users can also "invest" in other users they think will use these points wisely, but instead of (or in addition to) having points returned, the investment will produce an adjustment the investors quality score on the evolution of the quality score of the speaker in which you invested.

The pull down menu 808 allows the user to select the audience that should receive the message. For example, the audience may be everyone, family, coworkers, subscribers to a topic, or any other groups. The audience pull down menu 808 is populated based upon circles or groups that the user has created or that have been created for the user by the system in the social network application 109. Finally, the share button 810 will cause the message with the associated loudness points in the loudness box 804 to be sent.

Referring back to FIG. 4, the method continues with the user interface module 202 receiving 404 content for the message from the user. For example, the user types in the desired message into box 802 of the user interface 800. Next, the user interface receives 406 a loudness value that is to be associated with the message. Again, the user can assign any number of points from their pool of available points using the loudness box 804 of user interface 800. The user may also borrow points or send an emergency message as has been described above. Next, the user selects 408 an audience that will receive the message. Those skilled in the art will recognize that steps 404, 406, 408 can be performed by the user in any order, steps may be omitted, and the ordering in FIG. 4 is merely by way of example. Next the method determines 410 whether the user has decided to send the message, such as by selecting the share button 810. If not, the method returns to step 402 and continues to display the user interface 800 and receives input from the user in steps 404-408. If it is determined that the message should be sent, the method transitions to step 412 and the loudness controller 206 identifies the user and determines how many loudness points that the identified user has. The loudness controller 206 determines the user, accesses the data store and the record corresponding to the user to determine the number of loudness points that the user has available. Next loudness controller 206 determines 414 whether the user has enough loudness points to send a message. The loudness controller 206 compares the number of points the user has assigned to the message to the number of loudness points that the user has. If the user has enough points, the loudness controller 206 transmits 416 the message with the associated points to an output module such as the newsfeed module 210, the micro-blogging module 212, the social network module 214 or the self regulation module 216. On the other hand, if the user does not have enough points, the user is notified of the error and an indication that the message will not be sent. After either step 416 or step 418, the method is complete and ends.

Figure 5A:
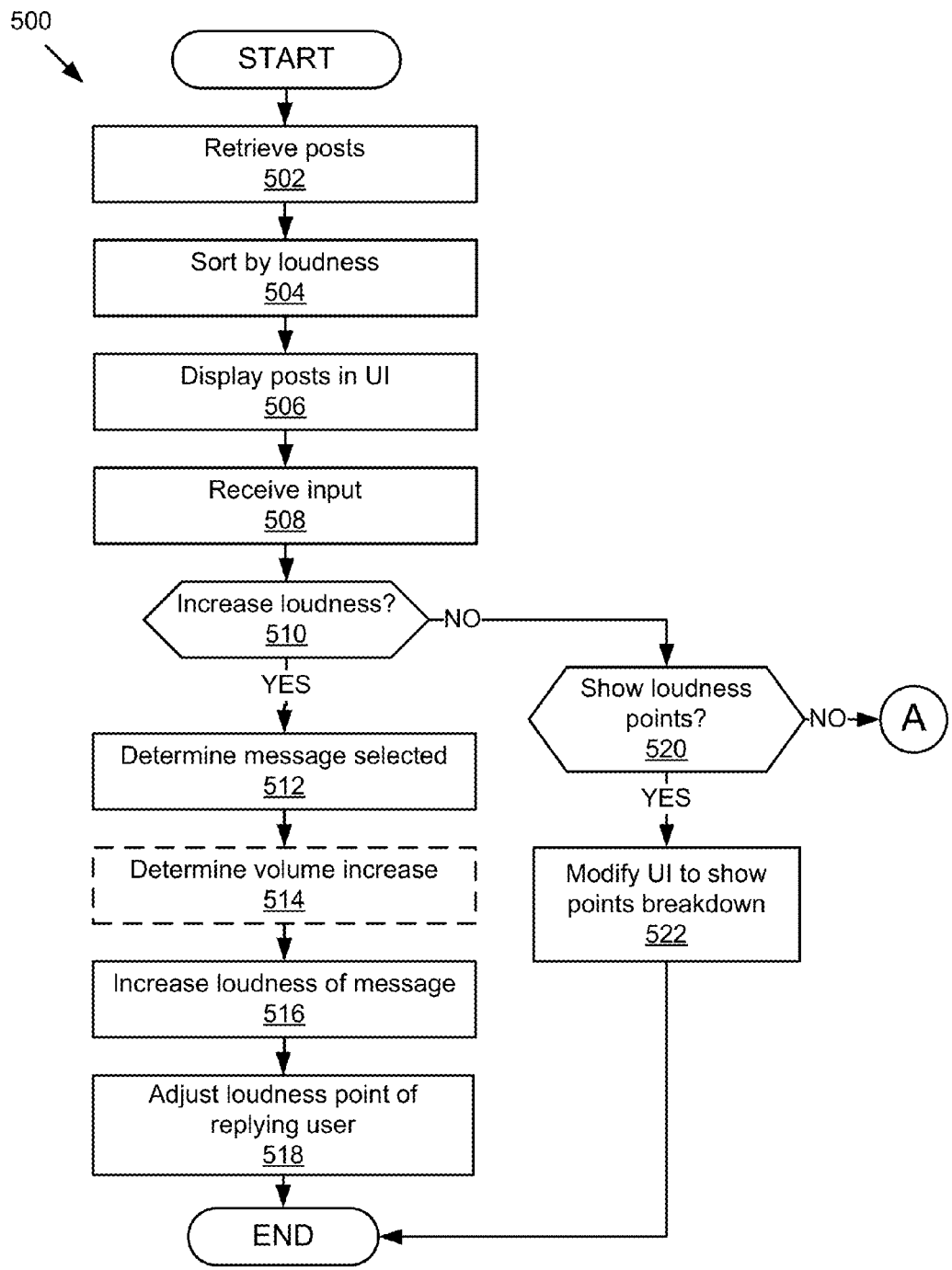
FIGS. 5A and 5B are a flowchart of a method for replying with loudness points according to one embodiment.
Figure 5B:
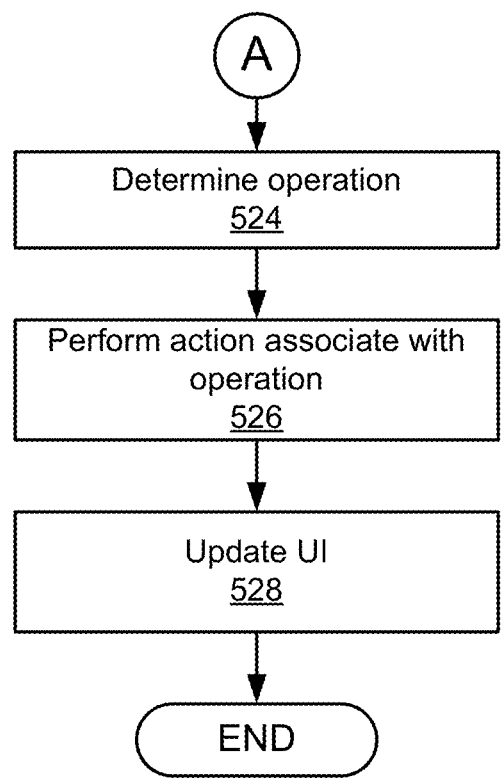

Referring now to FIGS. 5A and 5B, a method 500 for replying with loudness points is described. The method begins by receiving 502 posts or messages. In one embodiment, the messages are received by the loudness controller 206. The method then groups the messages according to relevance to particular users and sorts 504 the messages according to the number of loudness points associated with each message. In one embodiment, the loudness controller 206 filters the messages relevant to a user and then sorts those messages from the message with the highest number of loudness points to the message with the lowest number of loudness points. The sorted messages are displayed 506 by the user interface module 202 in a user interface 900.

Figure 9:
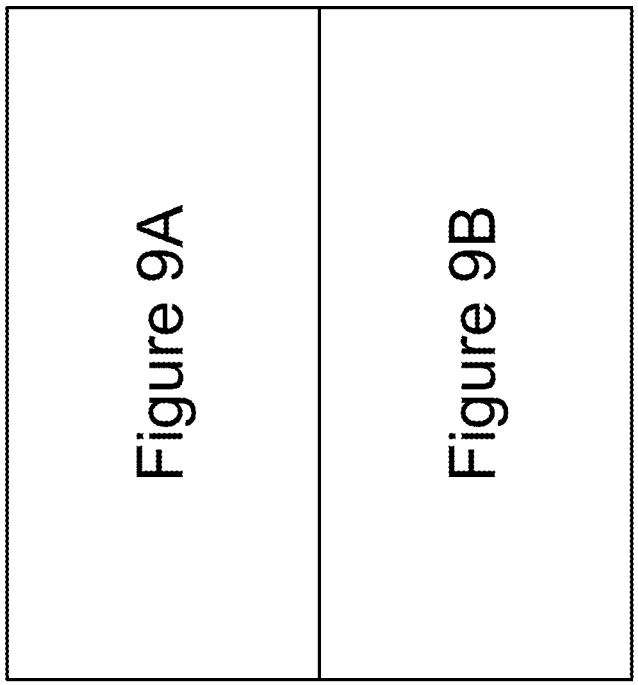
FIGS. 9A and 9B are graphic representations of one embodiment of a user interface for displaying messages with loudness points.
Figure 9A:
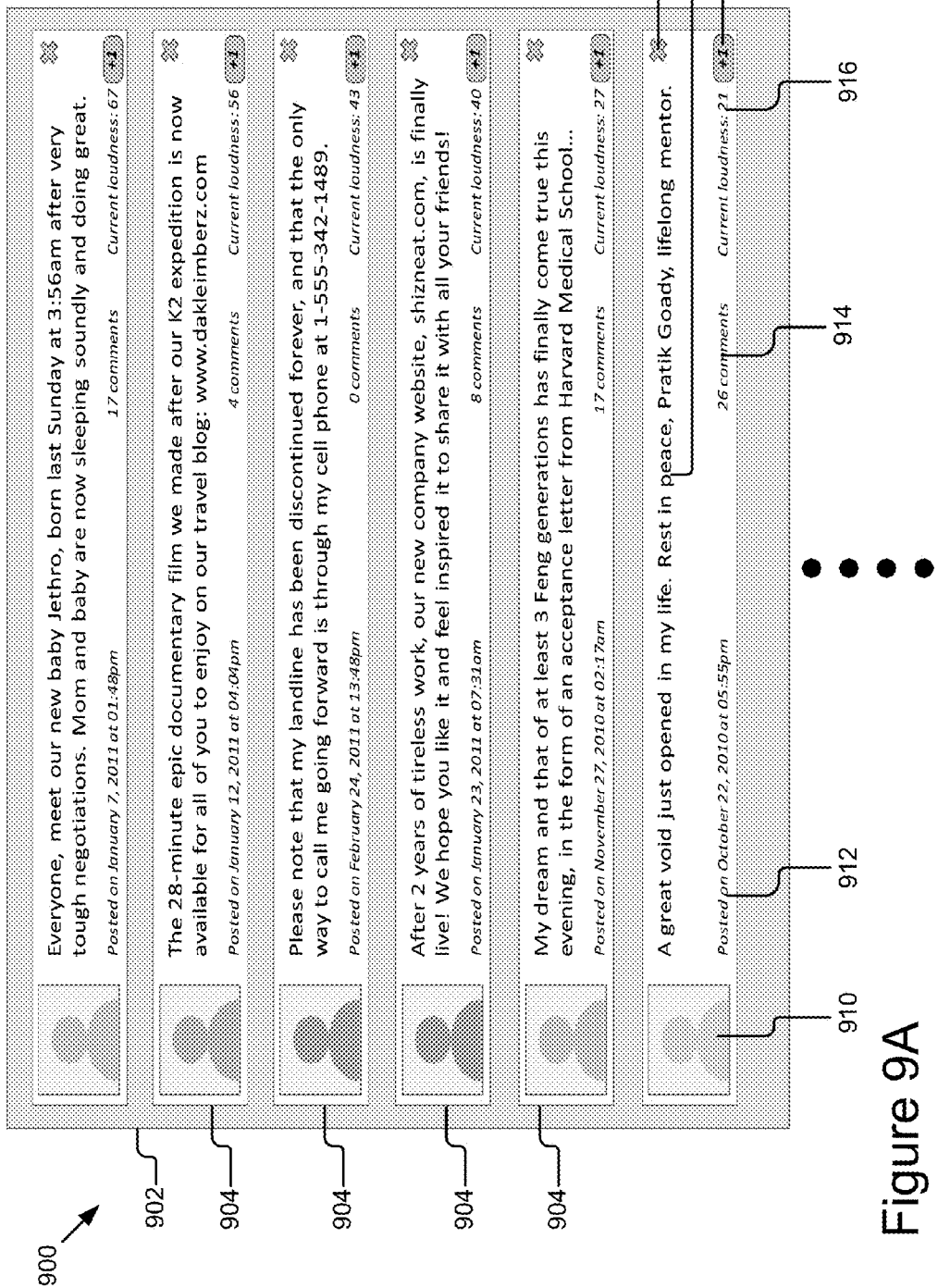
Figure 9B:
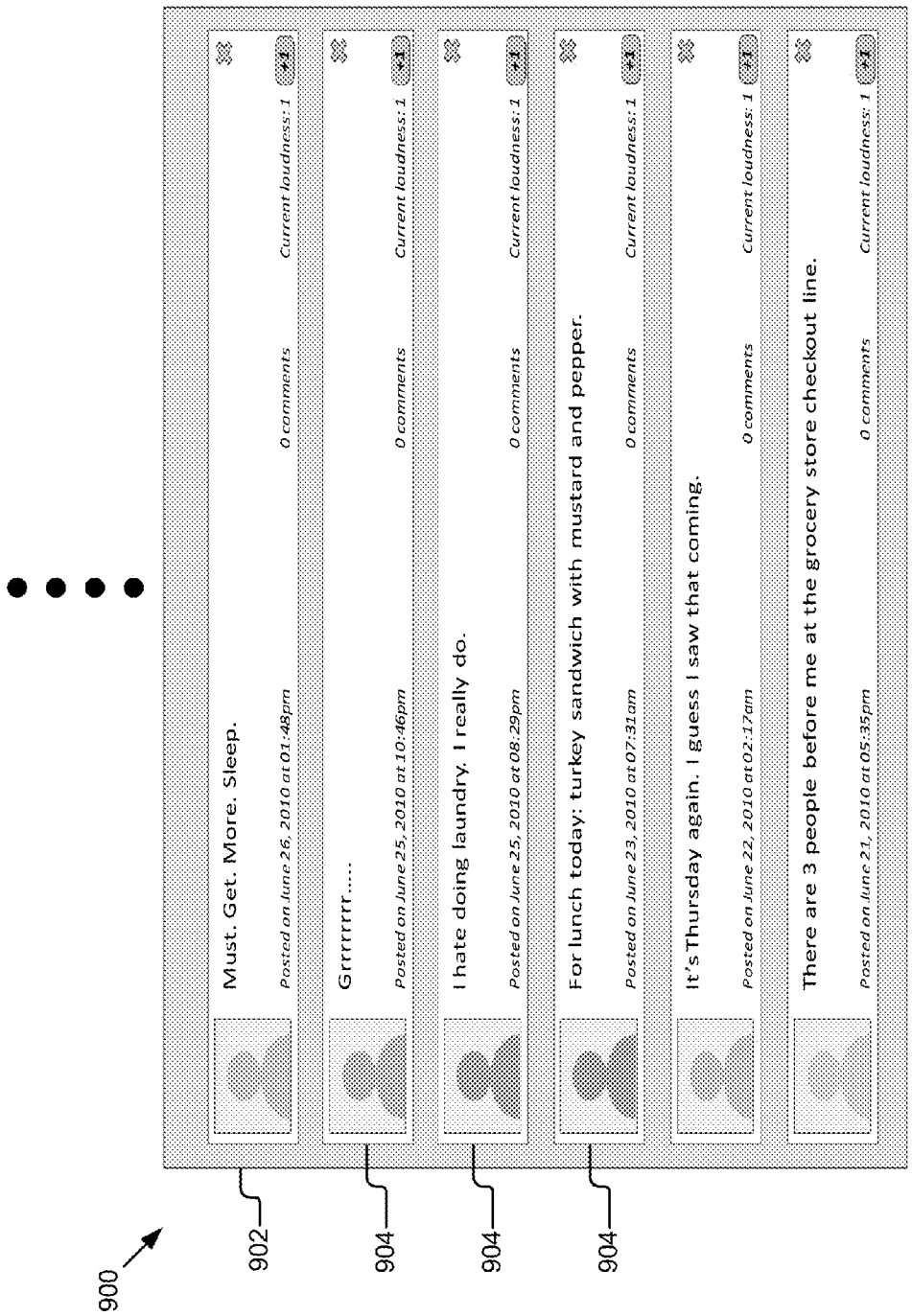

Referring now also to FIGS. 9A and 9B, an example user interface 900 will be described. The user interface 900 includes a window 902 that displays a plurality of messages 904. The user interface 900 shown in FIGS. 9A and 9B is populated with a plurality of example messages 904. The user interface 900 advantageously sorts the messages 904 in order with the message 904 having the highest number of loudness points at the top to the message 904 with the lowest number of loudness points at the bottom. In some embodiments, in addition to being displayed sorted by loudness, the message are also filtered with a date cutoff (or within a date range). For example, do not show messages older than 1 month, regardless of how they rank in loudness points. In this embodiment, each message 904 also includes a number of fields 910, 912, 914, 916, 920 and a number of possible input commands 918 and 922. The first field 910 of the message 904 provides identifying information for the author of the message. For example, the first field 910 can include a photograph of the user, a user name, a login name, nickname or other identifying information of the author of the message. The second field 912 provides the date and time which the message was posted. A third field 914 indicates the number of users that have commented on this message. In one embodiment, the third field 914 includes a hypertext or other type of link which when selected by the user displays the original message in a different user interface or new window as well as one or more of the reply messages. In one embodiment, the reply messages are sorted in order of loudness points. In another embodiment, the reply messages are shown indented and ordered from most current to least current. The fourth field 916 indicates the number of loudness points associated with the message 904. In this embodiment, the current loudness is an indication of the cumulative loudness points that are associated with the message 904 from the original author of the message 904 as well as replies. In another embodiment, the current loudness value is presented in multiple fields, one of which is a total number of loudness points, a second of which provides the original loudness points assigned to the message, the third field provides a total of the loudness points from reply messages and a fourth field provides a number of points lost to time decay. In other embodiments, the order of the messages 904 is sortable on any of these three fields. In still another embodiment, the fourth field 916 is selectable and if the user selects the fourth field 916 the number of loudness points originally associated with the message and the number of reply loudness points are displayed to the user. The final field 920 provides the message content itself.

In addition to the fields 910, 912, 914, 916, 920 providing information about the message 904, each message 904 also includes a number of buttons 918, 922 for taking action relative to the message 904. The first button 918 will remove the message 904 from the user interface 900, and thus the newsfeed. The user has the option to remove the particular message 904 associated with the button 918. In another embodiment, selection of the remove button 918 removes messages 904 by this author. This can either be done automatically, or by presentation of additional pop-up window that allows user selection. The other button 922 is to provide additional loudness points based on either review or reply to the message. In one embodiment as shown, each button 922 has a default loudness value shown thereon, and when the loudness button 922 is selected by the user, that number of loudness points are added to the loudness value for this message. Although the example shown in FIGS. 9A and 9B, shows the same loudness value of "+1", those skilled in the art will recognize that in other embodiments the loudness point value associated with each button may be different such as "+n" or variable. In some embodiments, the loudness points are also deducted from the user that selected the loudness button 922. For example, the deduction can be one to one based on how many loudness points the user associated with the reply. However, if the system wants to encourage replies, the deduction can be a fraction of the number of loudness points associated with the reply or even zero. In another embodiment, selection of the loudness button 922 presents a pull down menu that allows the user to specify the number of points with which they would like to add to the message being reviewed. In yet another embodiment, selection of the loudness button 922 causes a reply window to be presented. The reply window similar to that shown in FIG. 8 is presented with the original message as well as a box for the user to input their reply. The reply window includes the ability to associate any number of loudness points with the reply message, subject to the limitation that the points will be contacted from the user's pool of available points. In still another embodiment, additional buttons such as a reply but are added proximate the remove the loudness button 918, 922 to allow the user to take other action relative to a particular message 904. This user interface 900 is particularly advantageous because high importance messages start and stay at the top even if audiences take a while before commenting, while low importance messages start and stay at the bottom.

Referring back to FIG. 5A, the method continues receiving 508 input from the user by the user interface module 202. Next the method determines 510 whether the input was to increase the loudness of the message. If so, the method determines 512 the message corresponding to the input provided by the user. In other words, the loudness controller 206 determines the message corresponding to the loudness button 922 that was selected. In one embodiment, the method determines 514 the number of loudness points, in other words, the volume, that should be added to the message. This step is shown with dashed lines in FIG. 5A because it is optional in some embodiments where the number of loudness points associated with the loudness button 922 is preset to be a default value. In other embodiments, the number of loudness points may vary and the loudness controller 206 determines the loudness points associated with the particular loudness button 922 corresponding to the message. In still other embodiments, the number of loudness points is input by the user and to this number is received from the user interface module 202. Next, the method continues by increasing 516 the loudness points for the message. For example, the loudness controller 206 determines the number of loudness points and updates the loudness points in the record corresponding to the message that is stored in data store 204. In some embodiments, the method continues to adjust 518 the number of loudness points selected by the user and deducts them from the user's available loudness points stored in the data store 204. After step 518 the method is complete and ends.

If on the other hand the method determined in step 510 that the input received from the user in step 508 was not to increase the loudness points, the method proceeds from step 510 to step 520. In step 520, the method determines whether the user has selected the loudness link or input and would like to show the breakdown of how the current loudness total is derived. If the user is interested in seeing the breakdown of the loudness points, the method continues to step 522 to modify the user interface 900 to show the breakdown of the loudness points, after which the method is complete and ends. If not, the method continues from step 520 in FIG. 5A to step 524 in FIG. 5B. In step 524, the method determines the operation was input by the user. For example, the user may have input or selected the remove button 918 or reply button to perform some other action relative to the message 904. Next to the method performs the action associated with the input and then updates the user interface 900 after which the method is complete and ends.

Figure 6:
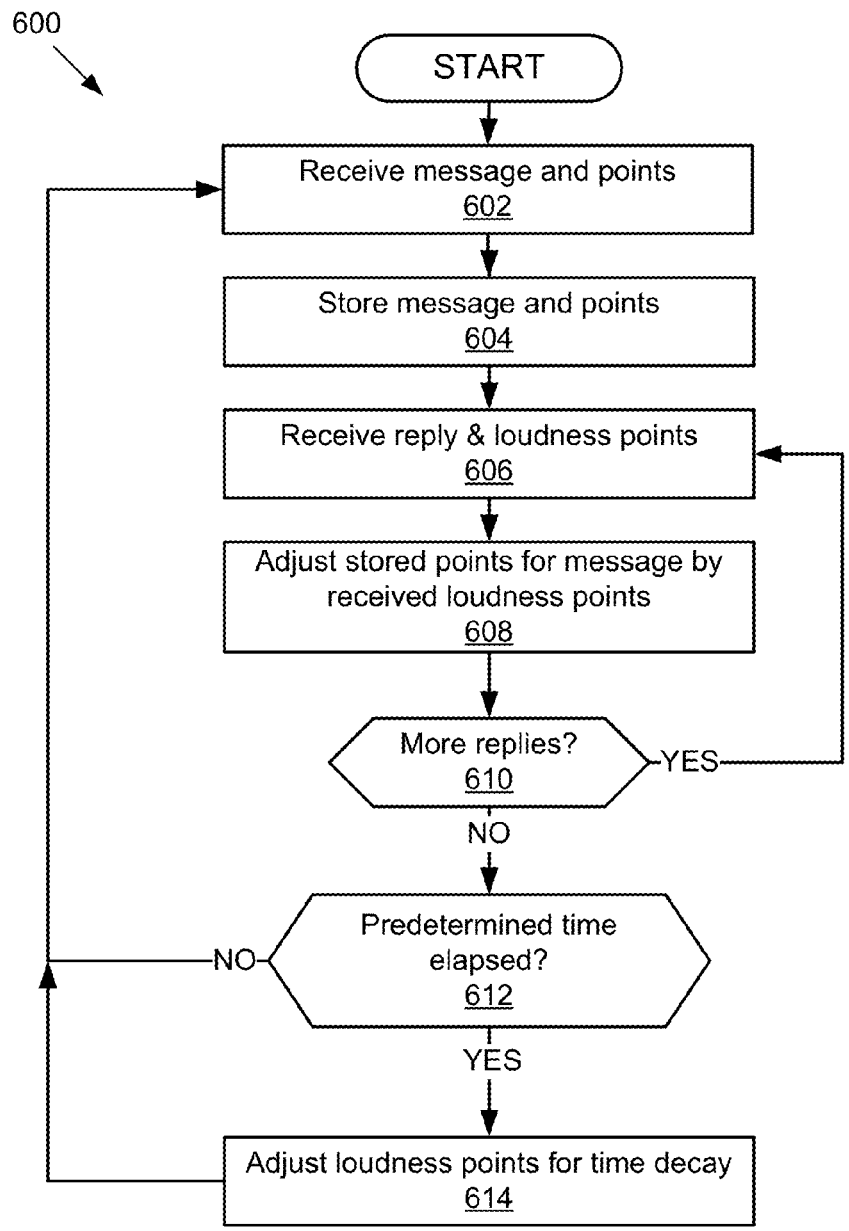
FIG. 6 is a flowchart of a method for modifying the points for message according to one embodiment.

Referring now to FIG. 6, a method 600 for modifying the point value for message will be described in more detail. The method begins by receiving 602 a message and its associated point value. Then the method stores 604 the message and its point value in the data store 204. The loudness controller 206 then receives 606 reply messages and reply loudness points that correspond to the message. The loudness controller 206 determines the original message corresponding to reply message and adjust the loudness points for that original message by the number of reply loudness points associated with the reply and then stores that information in the data store 204. Next the method determines 610 whether there are additional replies that need to be processed. If so, the method performs steps 606 and 608 for each reply. If there are no more replies, the method continues to determine 612 whether a predetermined amount of time has elapsed. If not, the method returns to step 602 and continues to adjust the point values of the messages. On the other hand, if a predetermined amount of time has elapsed, then the loudness points for a particular message are adjusted 614. In one embodiment, the present invention reduces the loudness points for each message based on the passage of time. For example, messages with more than one loudness point will lose one point every day until they reach a small fraction of their maximal loudness. This is particularly advantageous because it assures that the most relevant and timely messages continue to appear near the top of the user interface 900. In one embodiment, the messages are processed and adjusted for time decay individually. In other embodiments, the regulation module 103 adjusts the loudness point values for the messages in the data store such as once a day, once a week, once a month or at some other interval. After the messages have been adjusted for time decay, the method returns to step 602 continues to adjust loudness point values of the messages. While the method 600 disclosed above with reference to FIG. 6 anticipates a process in which the loudness point values are adjusted on a continual basis, those skilled in the art will recognize that this method may be performed at various different times, periodically, or in ways other than on a continual basis.

Figure 7:
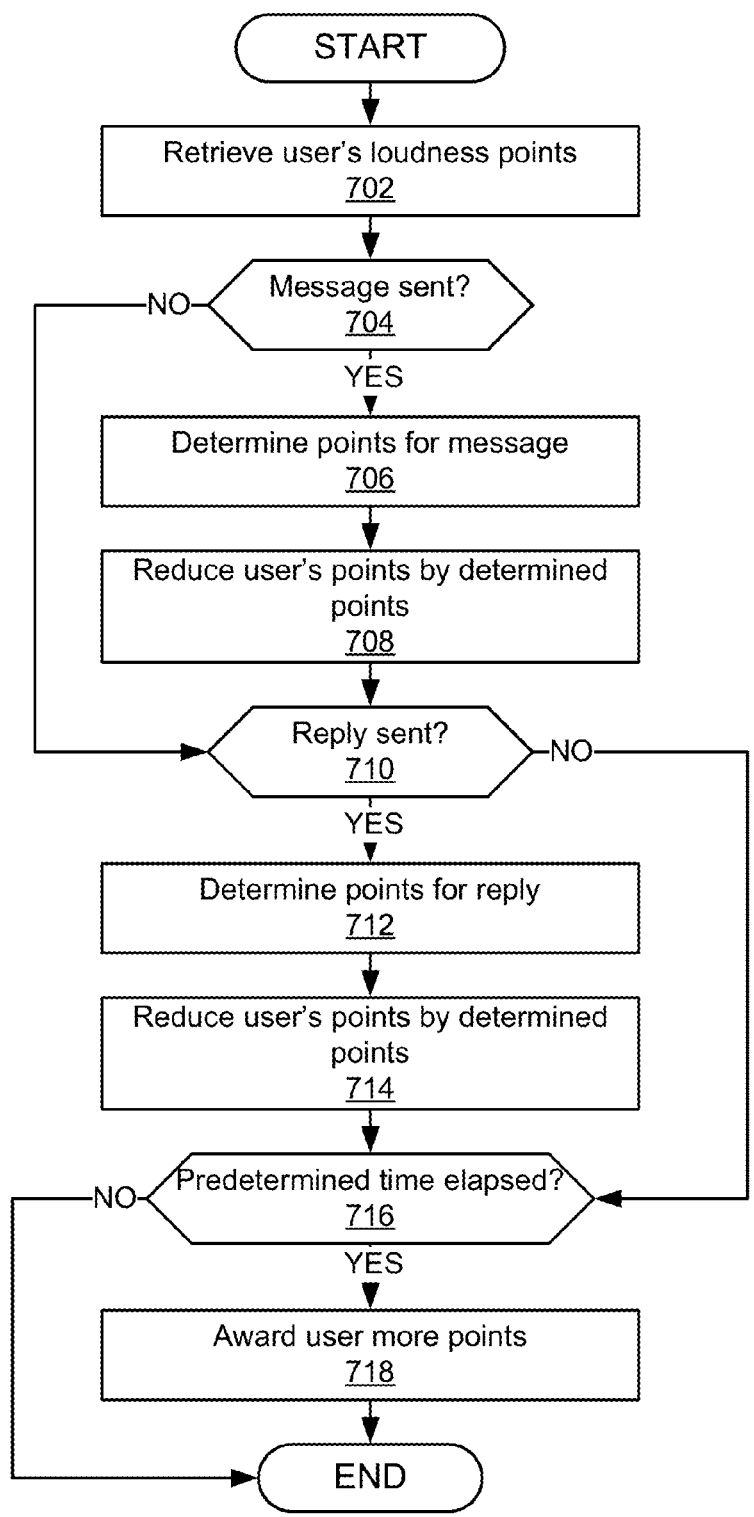
FIG. 7 is a flowchart of a method for modifying a point total of the user according to one embodiment.

Referring now to FIG. 7, a method 700 for modifying a point total of the user is described. The method begins by retrieving 702 a user's loudness points from the data storage 204. Next the method determines 704 whether the user has sent any messages. If not, the method continues in step 710 as will be described below. However, if the user has sent messages, the method determines 706 the loudness points that the user associated with each message. Then the method reduces 708 the number of loudness points associated with that user by the number of determined points in step 706. For example, the loudness controller 206 updates the record for the user in the data store 204. The method then continues in step 710.

Next in step 710, the method determines whether the user has sent any reply messages. If not, the method continues in step 716 as will be described below. However, if the user has send reply messages, the method determines 712 the loudness points associated with each reply message. The available loudness points for the user is then reduced 714 by the number of loudness points determined in step 712, after which the method continues on to step 716.

In step 716, the method determines whether a predetermined amount of time has elapsed. If not, the method is complete and ends with no additional loudness points being given to the user. On the other hand, if a predetermined time has elapsed, the method continues to award 718 more loudness points to the user and adds them to the user's total of available loudness points, after which the method is complete and ends.

Figure 10:
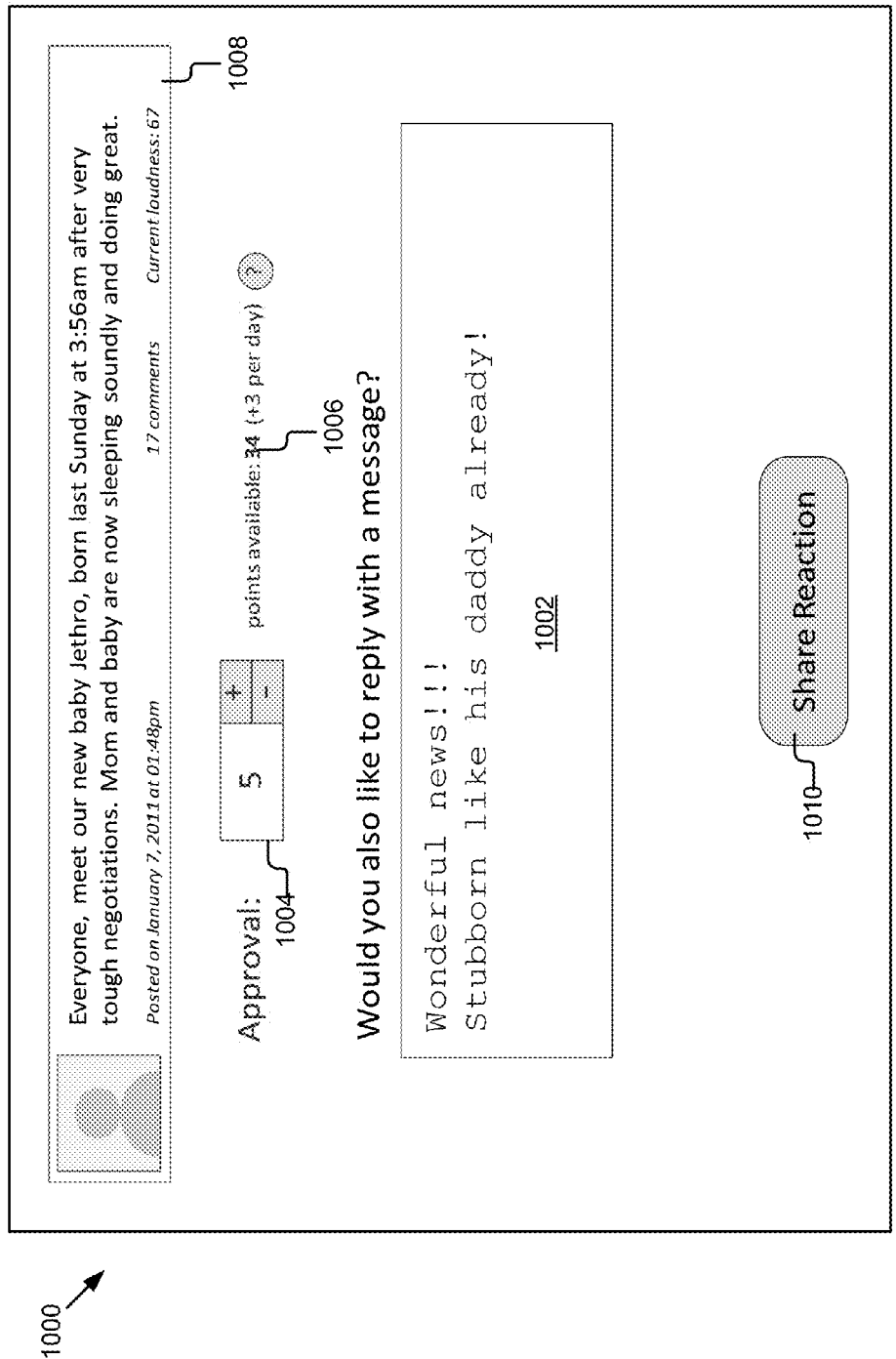
FIG. 10 is a graphic representation of one embodiment of a user interface for inputting a reply message and assigning approval points.

Referring now to FIG. 10, an example user interface 1000 for sending a reply messages with approval points is shown. In this embodiment, the points available for reply, approval points, are in a different pool than the loudness points for the original message. However, the loudness value is the sum of any loudness points and approval points. The user interface 1000 includes a window having a number of components including a reply box 1002 in which the user can input a reply message, an approval points box 1004 that allows the user to assign approval points, a field 1006 indicating the number of approval points available to the user, a copy of the message 1008 being replied to and other metadata for the message, a button 1010 for sending or sharing the message.

In the simplest embodiment, the reply box 1002 is an area in which the user can type in the message that they want posted or sent. As shown in FIG. 10, the reply box 802 has a caption of "Would you also like to reply with a message?"

The approval points box 1004 allows the user to input the number of approval points that the user would like to be associated with the reply in the reply box 1002. The user can either manually input a number in the approval points box 1004 or the user can use the "+" or "−" buttons to increment or decrement the value in the approval points box 1004. In one embodiment, the user interface module 202 automatically inputs an approval points value such as one or two into the approval points box 1004. Awarding more approval points to a particular message will make it appear more prominently in the audience's message feeds.

The field 1006 indicates the number of approval points available to the user. As noted above this is a different pool for approval points than from loudness points.

Field 1008 shows a copy of the message being replied to and other metadata for that message.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

What is claimed is:

1. A method for sending messages with loudness points to self regulate transmission of messages, the method comprising:
    receiving a message from a first user having a predefined number of available loudness points;
    receiving one or more loudness points associated with the message;
    determining the available loudness points for the first user;
    determining whether the available loudness points exceed or equal the one or more loudness points associated with the message;
    responsive to the available loudness points being less than the one or more loudness points associated with the message, scheduling to automatically send the message at a future time when the first user accumulates the one or more loudness points associated with the message;
    responsive to the available loudness points for the first user being greater than the one or more loudness points associated with the message, sending the message, the message remaining unsent when unassociated with the one or more loudness points;
    receiving a reply message from a second user, the second user having a predefined number of available loudness points;
    receiving one or more loudness points associated with the reply message; and
    modifying the one or more loudness points associated with the message by the one or more loudness points associated with the reply message.

2. The method of claim 1 wherein the available loudness points for the first user is modified by a quality rating.

3. The method of claim 2 wherein the quality rating is based on one or more from the group of a first user's reputation, expertise, number of messages sent, number of replies to the first user's messages, frequency of messages sent, quality of message sent, length of messages sent, and a social graph of the first user.

4. The method of claim 1, further comprising notifying the first user that the message will not be sent if the available loudness points for the first user is less than the one or more loudness points associated with the message.

5. The method of claim 1, further comprising determining an audience for delivery of the message.

6. The method of claim 1, further comprising:
    reviewing the message by a second user, the second user having a predefined number of available loudness points;
    receiving one or more loudness points associated with a review of the message; and
    modifying the loudness points associated with the message by the one or more loudness points associated with the review of the message.

7. The method of claim 1, further comprising decreasing the one or more loudness points associated with the message after a predetermined amount of time has elapsed.

8. The method of claim 7, wherein the one or more loudness points associated with the message are decreased by one point for each day since the message was sent.

9. The method of claim 1, further comprising increasing the available loudness points for the first user based on passage of time.

10. The method of claim 1, further comprising increasing the available loudness points for the first user based upon one from the group of a reputation of the first user, an expertise of the first user, and a number of replies received for messages sent by the first user.

11. A method for modifying loudness points for a message, the method comprising;
    receiving a first message;
    receiving one or more loudness points from an originator of the first message, the originator having a predefined number of available loudness points;
    setting loudness points for the first message to the one or more loudness points from the originator of the first message;
    scheduling to automatically send the first message at a future time when the originator accumulates the one or more loudness points for the first message based on the one or more loudness points for the first message being greater than the available loudness points of the originator;

sending the first message based on the one or more loudness points for the first message being equal or less than the available loudness points of the originator, the message remaining unsent when unassociated with the one or more loudness points;

receiving a reply message to the first message from a recipient of the first message and associated loudness points for the reply message from the recipient; and adjusting the loudness points for the first message based on the associated loudness points received for the reply message from the recipient.

12. The method of claim 11, wherein adjusting is performed by adding the associated loudness points for the reply message to the loudness points for the first message.

13. The method of claim 11, wherein adjusting includes multiplying the associated loudness points for the reply message by a quality rating value to generate a product and then adding the product to the loudness points for the first message.

14. The method of claim 11 further comprising:
receiving another reply message and other associated loudness points; and
adjusting the loudness points for the first message by the other associated loudness points to the loudness points for the first message.

15. The method of claim 11 further comprising:
receiving loudness points from review of the first message; and
adjusting the loudness points for the first message by the received loudness points from review of the first message.

16. The method of claim 11 further comprising:
determining whether a predetermined time has elapsed; and
reducing the loudness points for the first message by a set value if the predetermined time has elapsed.

17. The method of claim 16, wherein the predetermined time is a day and the set value is one loudness point.

18. The method of claim 11, further comprising storing the first message and the loudness points for the first message.

19. A method for modifying a loudness point total of a first user, the method comprising:
retrieving a predefined number of loudness points available to the first user;
determining a quality rating of the first user;
adjusting the loudness points available based upon the quality rating of the first user;
determining whether the first user has sent any messages, a message remaining unsent when unassociated with one or more loudness points and scheduling to automatically send the message at a future time when the first user accumulates the one or more loudness points associated with the message based on the one or more loudness points associated with the message being greater than the loudness points available to the first user;
determining loudness points associated with any sent messages, each sent message associated with the one or more loudness points;
reducing the loudness points available to the first user by the determined loudness points associated with any sent messages;
receiving a reply message to each sent message from a second user, the second user having a predefined number of available loudness points;
receiving one or more loudness points associated with the reply message; and
modifying the one or more loudness points associated with each sent message by the one or more loudness points associated with the reply message.

20. The method of claim 19, further comprising determining whether a predetermined time has elapsed; and
increasing the loudness points available to the first user by a set amount.

21. The method of claim 20, wherein the predetermined time is a day and the set amount is three loudness points.

22. The method of claim 19, further comprising:
determining whether the first user sent any replies;
determining loudness of points associated with any replies; and
reducing the loudness of points available to the first user by the determined loudness points associated with any replies.

23. The method of claim 19, further comprising:
determining whether the first user sent any reviews;
determining loudness of points associated with any reviews; and
reducing the loudness of points available to the first user by the determined loudness points associated with any reviews.

24. An apparatus for sending messages with loudness points to self regulate transmission of messages, the apparatus comprising:
a user interface module for generating and sending messages, the user interface module for receiving an input including a number of loudness points associated with a message from a first user, wherein the number is one or more, the message remaining unsent when unassociated with one or more loudness points;
a loudness controller coupled to the user interface module for receiving the message and the one or more loudness points associated with the message, the loudness controller determining whether to send the message based upon the availability of the one or more loudness points associated with the message in a pool of loudness points available to the first user, the loudness controller scheduling to automatically send the message at a future time when the first user accumulates the one or more loudness points associated with the message based upon the unavailability of the one or more loudness points associated with the message in the pool of loudness points available to the first user, the loudness controller receiving a reply message from a second user, the second user having a pool of available loudness points, the loudness controller receiving one or more loudness points associated with the reply message, the loudness controller outputting messages sorted by associated loudness points, the loudness controller adjusting the one or more loudness points associated with the message based upon a quality rating and the one or more loudness points associated with the reply message; and
a quality engine adapted to receive quality information and output quality ratings for users, the quality engine coupled to the loudness controller to provide the quality ratings.

25. The apparatus of claim 24 further comprising a data store for storing messages and associated loudness points and for storing user information including the quality rating and a number of available loudness points.

26. The apparatus of claim 24, wherein the loudness controller filters the messages based upon relevance to the first user and sorts the filtered messages from a message having a highest number of loudness points to a message having a gross number of loudness points.

27. The apparatus of claim 24, wherein the output of the loudness controller is provided to one from the group of a news feed module, a social network module, a micro-blogging module, and a self-regulation module.

28. The apparatus of claim 24, wherein the quality engine generates the quality ratings from one or more from the group of a user's reputation, expertise, number of messages sent, number of replies to the user's messages, frequency of messages sent, quality of message sent, length of messages sent, and a social graph of the user.

29. The method of claim 1, further comprising:
   determining a multiplier associated with a quality rating of the first user; and
   modifying the one or more loudness points associated with the message using the multiplier value.

* * * * *